United States Patent
Suzuki et al.

(10) Patent No.: US 6,680,890 B2
(45) Date of Patent: Jan. 20, 2004

(54) INFORMATION RECORDING APPARATUS

(75) Inventors: Shinji Suzuki, Tokorozawa (JP);
Masayoshi Yoshida, Tokorozawa (JP);
Ichiro Higuchi, Tokorozawa (JP);
Hiroshi Suzuki, Tokorozawa (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 10/199,019

(22) Filed: Jul. 22, 2002

(65) Prior Publication Data

US 2002/0181372 A1 Dec. 5, 2002

Related U.S. Application Data

(63) Continuation of application No. 09/233,423, filed on Jan. 20, 1999, now Pat. No. 6,507,541.

(30) Foreign Application Priority Data

Jan. 21, 1998 (JP) ............................................ P10-9834

(51) Int. Cl.⁷ .......................... G11B 7/085; G11B 17/22
(52) U.S. Cl. ............................... 369/53.24; 369/30.09; 369/47.13
(58) Field of Search .......................... 369/53.24, 47.13, 369/30.09, 30.04, 275.3; 711/170, 171; 707/201, 203, 200

(56) References Cited

U.S. PATENT DOCUMENTS

| | | | |
|---|---|---|---|
| 4,996,678 A | 2/1991 | Maeda | 369/32 |
| 5,107,481 A | 4/1992 | Miki et al. | 369/59 |
| 5,163,082 A | 11/1992 | Karnowski | 379/88 |

(List continued on next page.)

FOREIGN PATENT DOCUMENTS

| | | |
|---|---|---|
| EP | 0 406 021 A | 1/1991 |
| EP | 0 680 046 A | 11/1995 |
| EP | 0 713 334 A | 5/1996 |
| EP | 0 802 682 A | 10/1997 |
| EP | 0 929 072 A | 7/1999 |
| WO | WO 98/44508 | 10/1998 |

*Primary Examiner*—William Korzuch
*Assistant Examiner*—Kim-Kwok Chu
(74) *Attorney, Agent, or Firm*—Morgan, Lewis & Bockius LLP

(57) ABSTRACT

An information recording apparatus for recording record information onto a record medium, on which (i) a plurality of information groups each comprising one series of the record information and (ii) management information including positional information indicating a recorded area of each of the information groups are recordable, is provided with: a detecting device for detecting the management information, which is recorded in advance on the record medium, from the record medium; a recording device for newly recording the record information onto the record medium; an outputting device for outputting an identification information to identify the information groups, which are recorded in advance on the record medium, on the basis of the detected management information while the recording device is newly recording the record information; a specifying device for specifying an erasable information from among the information groups which are identified by the outputted identification information while the recording device is newly recording the record information; and a controlling device for controlling the recording device to newly record the record information to a recordable area, which includes the recorded area of the specified erasable information as well as a non-recorded area where the record information is not recorded, of the record medium on the basis of the positional information included in the detected management information.

20 Claims, 4 Drawing Sheets

U.S. PATENT DOCUMENTS

| | | |
|---|---|---|
| 5,555,388 A | 9/1996 | Shaughnessy ............... 395/427 |
| 5,724,322 A | 3/1998 | Kondo et al. ................. 369/32 |
| 5,751,371 A | 5/1998 | Shintani ..................... 348/564 |
| 5,848,422 A | 12/1998 | Sato et al. .................. 707/203 |
| 5,870,583 A | 2/1999 | Maeda .................. 395/497.01 |
| 5,901,119 A | 5/1999 | Inoue ...................... 369/30.09 |
| 6,088,304 A | 7/2000 | Aramaki et al. ......... 369/30.09 |
| 6,392,964 B2 * | 5/2002 | Koyata et al. ........... 369/30.04 |

* cited by examiner

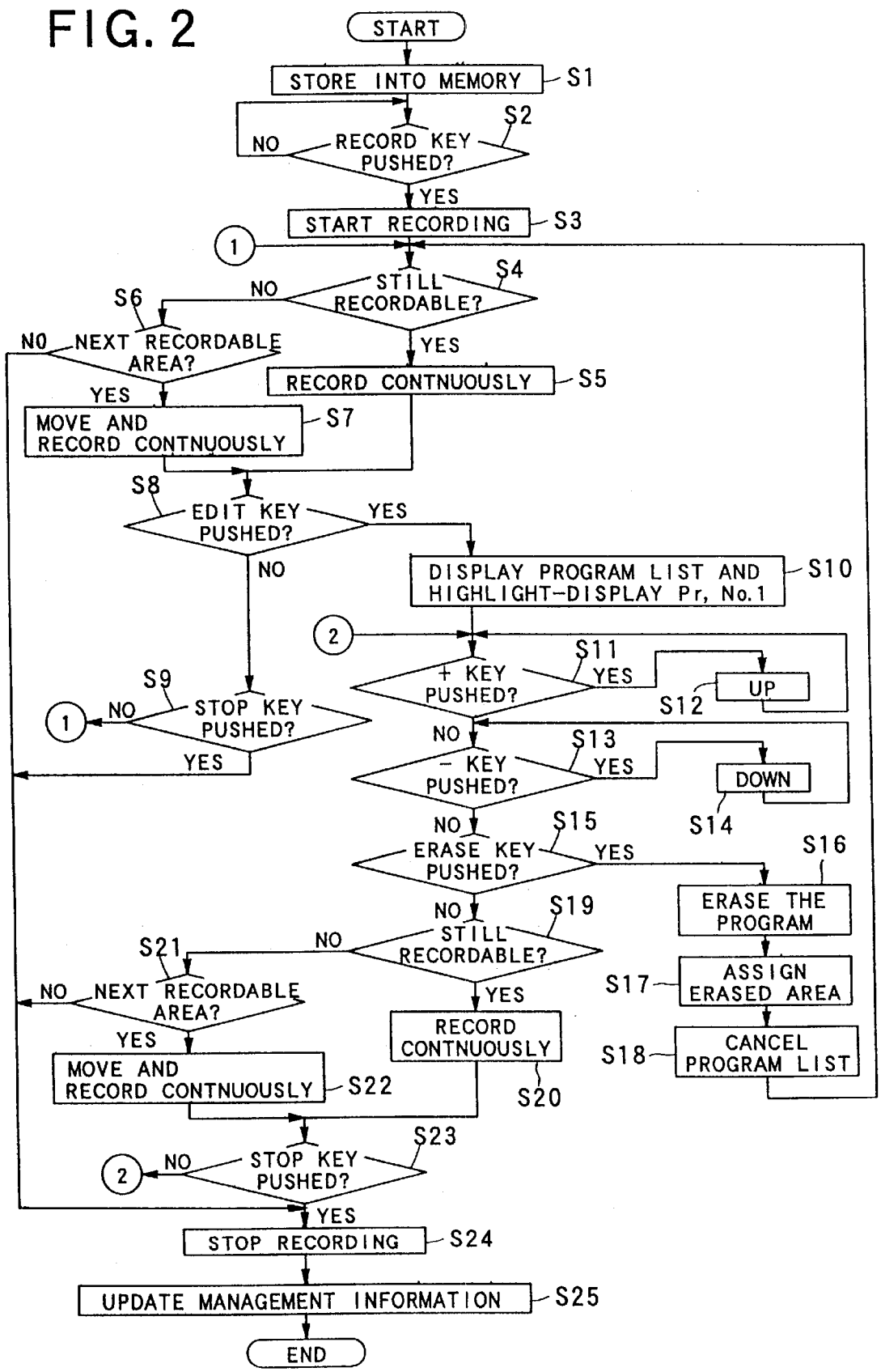

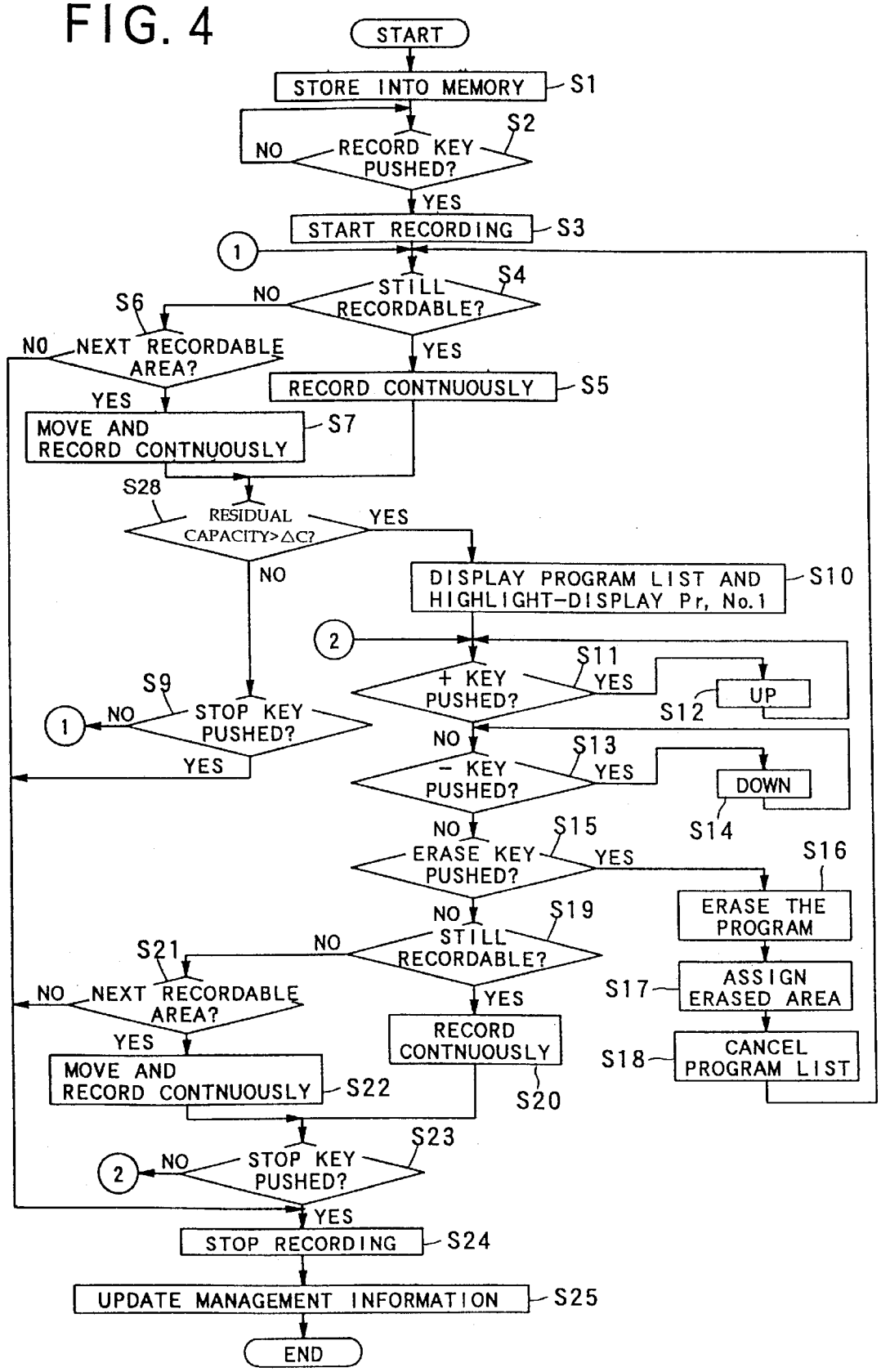

INFORMATION RECORDING APPARATUS

This is a continuation of copending application Ser. No. 09/233,423 filed on Jan. 20, 1999, now U.S. Pat. No. 6,507,541.

BACKGROUND OF THE INVENTION

1. Field of the Invention

The present invention generally relates to an information recording apparatus for recording record information such as video information and audio information, onto a record medium, and more particularly to an information recording apparatus for applying a process such as a compression process with respect to the record information and then recording it onto the record medium.

2. Description of the Related Art

There is a VTR (Video Tape Recorder) as an information recording apparatus capable of recording the information such as video information.

Here, in order to record the video and audio information of the television broadcast etc., onto a video tape on which the information has been already recorded, as a record medium in the conventional VTR system, the non-recorded portion of the video tape is firstly searched and the recording operation is started therefrom.

However, in the conventional VTR, when the residual capacity of the non-recorded portion (i.e., the recordable portion) decreases to be little after the operation of recording the information of the particular television broadcast etc., is started and such a possibility arises that the pertinent recording operation cannot be completed, there is a problem that the recording operation should be once stopped and should be re-started after exchanging the video tape. In this case, it is not possible to record the information of the television broadcast etc., which is received during the operation of exchanging the video tape.

On the other hand, when the residual capacity of the non-recorded portion decreases in the above mentioned way, even in case of erasing the recorded information and then recording the information of the television program etc., thereon, it is still not possible to continuously record all the information of the television broadcast etc., since it is necessary to search a recording position of a certain information, which is allowed by the user to be erased since it is less or little important for the user, from among the recorded information and then re-start recording therefrom.

SUMMARY OF THE INVENTION

It is therefore an object of the present invention to provide an information recording apparatus, which can continuously record more information desired to be recorded even if the residual capacity of the recordable area of a record medium decreases.

The above object of the present invention can be achieved by an information recording apparatus for recording record information onto a record medium, on which (i) a plurality of information groups each comprising one series of the record information and (ii) management information including positional information indicating a recorded area of each of the information groups are recordable. The information recording apparatus is provided with: a detecting device for detecting the management information, which is recorded in advance on the record medium, from the record medium; a recording device for newly recording the record information onto the record medium; an outputting device for outputting an identification information to identify the information groups, which are recorded in advance on the record medium, on the basis of the detected management information while the recording device is newly recording the record information; a specifying device for specifying an erasable information from among the information groups which are identified by the outputted identification information while the recording device is newly recording the record information; and a controlling device for controlling the recording device to newly record the record information to a recordable area, which includes the recorded area of the specified erasable information as well as a non-recorded area where the record information is not recorded, of the record medium on the basis of the positional information included in the detected management information.

According to the information recording apparatus of the present invention, the information groups and the management information may be recorded in advance on the record medium such as an optical disc. Namely, as long as a recording operation has ever been performed with respect to the pertinent record medium even once, the information groups and the management information are recorded. Otherwise, the management information indicates that there exist no recorded area but only the non-recorded area i.e., the recordable area. In operation, at first, the management information is detected from the record medium by the detecting device such as an optical pickup. Then, the record information is newly recorded onto the record medium by the recording device such as an optical pickup. While the recording device is newly recording the record information, the identification information to identify the information groups is outputted by the outputting device such as a CPU, on the basis of the detected management information. At this time, from among the information groups which are identified by the outputted identification information, an erasable information is specified by the specifying device such as a+key, −key and the like. Then, under the control of the controlling device such as a CPU, the recording device newly records the record information to the recordable area on the basis of the positional information included in the detected management information. Here, the recordable area includes the recorded area of the specified erasable information as well as the non-recorded area. Thus, the recording device can continue newly recording the record information to the recorded area of the erasable information even if the non-recorded area is diminished as the record information is newly recorded thereon. Therefore, it is possible to reserve the recorded area of the erasable information as the recordable area and to record more record information to the recordable area without stopping the recording operation.

Accordingly, it is possible to prevent the recording operation from being stopped in the middle thereof due to the shortage of the recordable area of the record medium.

In one aspect of the information recording apparatus of the present invention, the positional information further indicates the non-recorded area, and the controlling device controls the recording device to newly record the record information at first to the non-recorded area on the basis of the positional information included in the detected management information and then to continuously recording the record information to the recorded area of the specified erasable information when a recordable capacity of the non-recorded area is decreased to be less than a predetermined capacity.

According to this aspect, under the control of the controlling device, at first, the record information is recorded to the non-recorded area on the basis of the positional information, which indicates the non-recorded area, included in the detected management information. Then, when the recordable capacity of the non-recorded area is decreased to be less than a predetermined capacity, under the control of the controlling device, the record information is continuously recorded to the recorded area of the specified erasable information. Accordingly, even if the non-recorded area is diminished, it is still possible to reserve the recorded area of the erasable information as the recordable area and to record more record information to the recordable area without stopping the recording operation.

In another aspect of the information recording apparatus of the present invention, one or a plurality of the information groups constitutes a program, the identification information includes (i) a title of the program and (ii) date and time of recording the program, and the outputting device outputs the identification information as a program list or table including the title and the date and time.

According to this aspect, one or a plurality of the information groups constitutes a program. Thus, one program, which comprises one or a plurality of the information groups, or a plurality of programs, each of which comprises one or a plurality of the information groups, may be recorded in advance on the record medium. In operation, a program list or table including the title of each program and the date and time of recording each program is outputted by the outputting device. It is possible for the user to easily determine the erasable information with referring to the outputted program list or table, so that the erasable information can be certainly specified by the specifying device.

In this aspect, the outputting device may be provided with a displaying device for displaying the program list or table, the specifying device specifying the erasable information on the displayed program list or table. Thus, in this case, the program list or table is displayed by the displaying device. Then, the erasable information is specified on the displayed program list or table by the specifying device.

Further in this aspect, the displaying device may highlight-display each portion of the program list or table as a candidate of the erasable information, the specifying device specifying the highlight-displayed portion as the erasable information. Thus, in this case, since the highlight-displayed portion as a candidate of the erasable information is specified by the specifying device as the erasable information, it is possible to easily specify the erasable information.

In another aspect of the information recording apparatus of the present invention, the apparatus is further provided with an inputting device for inputting various instructions including an output instruction to instruct the outputting device to output the identification information, the outputting device outputting the identification information when the output instruction is inputted by the inputting device.

According to this aspect, in operation, when the output instruction is inputted by the inputting device, the identification information is outputted by the outputting device. Thus, when the user desires to reserve the erasable information as the recordable area so as to increase the recordable area, the identification information can be outputted by inputting the output instruction by a manual operation etc., of the user. Accordingly, the erasable information can be specified as the occasion demand.

In another aspect of the information recording apparatus of the present invention, the apparatus is further provided with a judging device for judging whether or not a residual capacity of the recordable area is larger than a predetermined capacity, the outputting device outputting the identification information if the residual capacity is judged to be not larger than the predetermined capacity.

According to this aspect, in operation, if the residual capacity is judged to be not larger than the predetermined capacity, the identification information is outputted by the outputting device. Thus, it is not necessary for the user to check or monitor the recordable area, but the identification information can be automatically outputted. Accordingly, the erasable information can be specified as the occasion demand.

In anther aspect of the information recording apparatus of the present invention, the apparatus is further provided with an updating device for updating the management information so that the updated management information includes the positional information indicating the recorded area after the recording device newly records the record information, the recording device further recording the updated management information onto the record medium.

According to this aspect, after the recording device newly records the record information, the management information is updated by the updating device. Then, the updated management information is recorded onto the record medium by the recording device. Thus, the updated management information can be always recorded on the record medium, and it is possible to perform a recording operation on the basis of the updated management information.

In another aspect of the information recording apparatus of the present invention, the apparatus is further provided with a memory device for storing the detected management information.

According to this aspect, in operation, when the management information is detected by the detecting device, it is stored into the memory device. Thus, it is possible to perform the recording operation after that, by use of the management information stored in the memory device.

In another aspect of the information recording apparatus of the present invention, the apparatus is further provided with a reproducing device for reproducing the management information from the record medium and reproducing the record information on the basis of the detected management information.

According to this aspect, in operation, the management information is firstly reproduced from the record medium by the reproducing device. Then, the record information is reproduced from the record medium on the basis of the reproduced management information by the reproducing device. Thus, it is possible to reproduce the record information from the record medium appropriately on the basis of the management information even if the information groups are discretely recorded on the record medium.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a flow chart showing an operation of the information recording apparatus of FIG. 1;

FIG. 4 is a flow chart showing an operation of the information recording apparatus in a second embodiment of the present invention.

DETAILED DESCRIPTION OF THE PREFERRED EMBODIMENTS

Referring to the accompanying drawings, embodiments of the present invention will be now explained. In the embodiments described below, the present invention is applied to an information recording and reproducing apparatus capable of recording and reproducing the information with respect to a record medium in a disc shape (hereinafter, it is simply referred to as an "optical disc") which can optically record and reproduce the information.

(I) First Embodiment

A first embodiment of the present invention will be explained with reference to FIG. 1 to FIG. 3B At first, a construction of the information recording and reproducing apparatus as the embodiment is explained with reference to FIG. 1.

Figure 1:
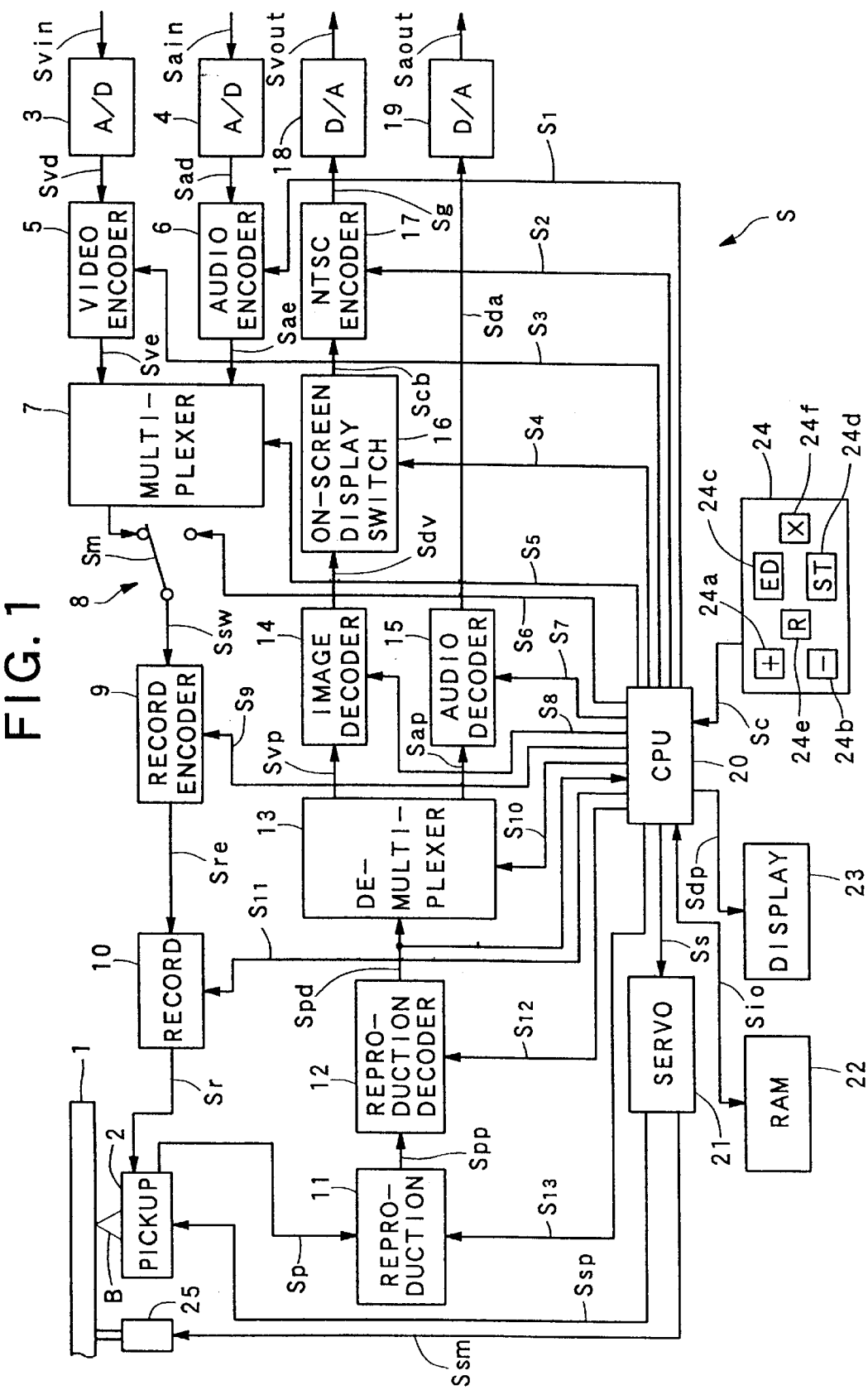
FIG. 1 is a block diagram of an information recording apparatus as an embodiment of the present invention.

In FIG. 1, an information recording and reproducing apparatus S is provided with: an optical pickup 2 as one example of a recording device and a management information detecting device; A/D (Analog to Digital) converters 3 and 4; a video encoder 5; an audio encoder 6; a multiplexer 7; a switch 8; a record encoder 9; a record circuit 10; a reproduction circuit 11; a reproduction decoder 12; a demultiplexer 13; an image decoder 14; an audio decoder 15; an on-screen display switch circuit 16; an NTSC (National Television System Committee) encoder 17; D/A converters 18 and 19; a CPU (Central Processing Unit) 20 as one example of a record controlling device and an outputting device; a servo circuit 21; a RAM (Random Access Memory) 22; a display unit 23; an operation unit 24; and a spindle motor 25.

The operation unit 24 is provided with: a+key 24a and a −key 24b as one example of an instructing device which is operated when selecting an erasable program, which can be erased (i.e., which is allowed by the user to be erased) from an optical disc 1, by a process described later; an edit key 24c which is operated when performing a process of selecting the erasable program as described later; a stop key 24d which is operated when the information recording operation is to be stopped; a record key 24e which is operated when the information recording operation is to be started; and an erase key 24f which is operated when the recorded program is to be erased.

Next, the operation of each constitutional element is explained.

At first, the operation is explained as for the case where the information to be recorded (which includes video information and audio information) from an external device is recorded onto the optical disc 1 as one example of the record medium.

When an audio information signal Sain (which is an analog signal) corresponding to the audio information to be recorded is inputted from an external device, the A/D converter 4 digitizes the audio information signal Sain and generates a digital audio information signal Sad to output it to the audio encoder 6.

Then, the audio encoder 6 compresses the inputted digital audio signal Sad by the MPEG 2 (Moving Picture coding Experts Group 2) method on the basis of a control signal S1 outputted from the CPU 20, and outputs it as a compressed audio signal Sae.

In parallel to this, when a video information signal Svin (which is an analog signal) corresponding to the video information to be recorded is inputted from an external device, the A/D converter 3 digitizes the video information signal Svin and generates a digital video information signal Svd to output it to the video encoder 5.

Then, the video encoder 5 compresses the inputted digital video signal Svd by the MPEG 2 (Moving Picture coding Experts Group 2) method on the basis of a control signal S3 outputted from the CPU 20, and outputs it as a compressed video signal Sve.

Then, the multiplexer 7 multiplexes the compressed audio signal Sae and the compressed video signal Sve which are respectively inputted thereto and generates a multiplexed signal Sm to output it to one input terminal of the switch 8.

Then, the switch 8 switches to output one of the multiplexed signal Sm and a management information signal S6 from the CPU 20 under the control of the CPU 20, as a switched signal Ssw to the record encoder 9.

Then, the record encoder 9 applies a so-called formatting process, which is to convert the format of the switched signal Ssw to the format suitable for recording on the optical disc 1, with respect to the inputted switched signal Ssw on the basis of a control signal S9 outputted from the CPU 20, and generates a record encode signal Sre to output it to the record circuit 10.

Then, the record circuit 10 converts the record encode signal Sre, which is inputted from the record encoder 9, into a record signal Sr for recording on the basis of a control signal S11 outputted from the CPU 14, to output it to the optical pickup 2. At this time, in the record circuit 10, a so-called write strategy process or the like is performed with respect to the record encode signal Sre so as to form a pit in a shape, which precisely corresponds to the information to be recorded, on the optical disc 1.

Then, the optical pickup 2 generates a light beam B such as a laser light etc., by driving a light source such as a semiconductor laser etc., within the optical pickup 2, on the basis of the record signal Sr outputted from the record circuit 10, emits the generated light beam B onto an information record surface of the optical disc 1, and records the record signal Sr onto the optical disc 1 by forming the pit corresponding to the record signal Sr. At this time, the optical disc 1 is rotated at a predetermined rotation number by the spindle motor 25, which is driven on the basis of a spindle control signal Ssm outputted from the servo circuit 21. Incidentally, on the optical disc 1, the record signal Sr is recorded by forming the pit corresponding to the record signal Sr by a phase modulating method for example.

Next, the operation of the embodiment is explained as for the case where the information recorded on the optical disc 1 is reproduced.

At the time of reproducing the information, the optical pickup 2 emits the light beam B for the reproduction onto the optical disc 1 which is being rotated, and generates a detection signal Sp corresponding to the pit formed on the optical disc 1 on the basis of a reflection light of the emitted light beam B to output it to the reproduction circuit 11.

Then, the reproduction circuit 11 amplifies the detection signal Sp outputted from the optical pickup 2 at a predetermined amplification factor and trims the waveform of the detection signal Sp, on the basis of a control signal S13 outputted from the CPU 20, and generates a reproduction signal Spp to output it to the reproduction decoder 12.

Then, the reproduction decoder 12 applies a so-called unformatting process, which corresponds to the formatting process in the record encoder 9, with respect to the inputted reproduction signal Spp on the basis of a control signal S12 outputted from the CPU 20, and generates a decode signal Spd to outputs it to the demultiplexer 13 and the CPU 20.

After that, the demultiplexer 13 separates an audio reproduction signal Sap including the audio information and a video reproduction signal Svp including the video information from the inputted decode signal Spd, on the basis of a control signal S10 outputted from the CPU 20. Then, the demultiplexer 13 outputs the separated audio reproduction signal Sap to the audio decoder 15, and outputs the separated video reproduction signal Svp to the video decoder 14.

Then, the audio decoder 15 decodes and expands the audio reproduction signal Sap by a decoding method, which corresponds to the encoding method in the audio encoder 6, on the basis of a control signal S7 outputted from the CPU 20, and generates an audio decode signal Sda to output it to the D/A converter 19.

Then, the D/A converter 19 converts the audio decode signal Sda into an analog form, and generates an audio output signal Saout corresponding to the audio information signal Sain to output it to a speaker etc., of an external device.

In parallel to this, the video decoder 14 decodes and expands the video reproduction signal Svp by a decoding method, which corresponds to the encoding method in the video encoder 5, on the basis of a control signal S8 outputted from the CPU 20, and generates a video decode signal Sdv to output it to the on-screen display switch circuit 16.

Then, the on-screen display switch circuit 16 switches to output one of the video decode signal Sdv and a display information signal S4 outputted from the CPU 20, and outputs it as a switched signal Sch to the NTSC encoder 17. Here, the display information signal S4 includes an on-screen information to be displayed in place of the video image indicated by the reproduced video decode signal Sdv (e.g., a reproduction mode, an attribute etc., of the video image which is presently being displayed).

After that, the NTSC encoder 17, applies the encoding process based on the NTSC method with respect to the inputted switched signal Sch, on the basis of a control signal S2 outputted from the CPU 20, and generates a video signal Sg to output it to the D/A converter 18.

Then, the D/A converter 18 converts the video signal Sg into an analog form, and generates a video output signal Svout corresponding to the video information signal Svin or the on-screen information to output it to a monitor etc., of an external device.

Along with the recording and reproducing operations by the above explained constitutional elements, the CPU 20 outputs the control signals S1 to S3, S5 and S7 to S13, on the basis of the management information described later which is inputted as one portion of the decode signal Spd respectively so as to perform the processes shown in the flow chart of FIG. 2 described later in detail. At this time, as the keys (e.g., the +key 24a, the −key 24b, the edit key 24c, the stop key 24d, the record key 25e and the erase key 24f) are operated by the user as the occasion demands, the operation unit 20 outputs a command signal Sc, which corresponds to the operation operated by the user on these keys and which is to control the operations of the constitutional elements, to the CPU 20, so that the CPU 20 outputs the control signals S1 to S3, S5 and S7 to S13 on the basis of the command signal Sc.

In parallel to this, the CPU 20 generates a control signal Ss to servo-control the spindle motor 25 and the optical pickup 2 and output it to the servo circuit 21. The servo circuit 21 generates the spindle control signal Ssm to control the rotation of the spindle motor 25 on the basis of the control signal Ss, and outputs it to the spindle motor 25. The servo circuit 21 also generates a pickup control signal Ssp to perform so-called tracking servo control and focus servo control in the optical pickup 2, and output it to the optical pickup 2. The optical pickup 2 performs the operation of recording the record signal Sr or the operation of detecting the detection signal Sp while performing the tracking servo control and the focus servo control with respect to the light beam B on the basis of the pickup control signal Ssp.

Further in parallel to this, the CPU 20 temporarily stores the inputted management information as a management signal Sio into the RAM 22. Incidentally, the RAM 22 temporarily stores the information necessary for the process in the CPU 20 other than the management signal Sio and outputs it to the CPU 20 as the occasion demands.

On the other hand, the information necessary for the user to control the operation of the information recording and reproducing apparatus S is displayed on the display unit 23 on the basis of a display signal Sdp from the CPU 20.

Next the recording and reproducing operations of the information recording and reproducing apparatus S having the above described construction will explained with reference to FIG. 1 to FIG. 3B.

At first, before explaining the concrete recording operation, the management information, which is recorded on the optical disc 1 in advance, is explained with reference to FIG. 3A.

If there exists the recorded information which has been already recorded (which is referred to simply as a "program" for each unit thereof hereinbelow), the management information includes: the number of the units of record areas (which is referred to simply as an "area" hereinbelow) on the optical disc 1 included in the pertinent program; and the address indicating a recording position on the optical disc 1 of the pertinent area; or the number of the recordable areas to which information can be newly recorded (which may be a non-recorded area to which no information has ever been recorded as well as a re-writable (over-writable) area which is specified in advance by the user from among the areas to which the recorded information has been already recorded); and the address indicating the position of the pertinent recorded area on the optical disc 1; and further includes the recording date and time related to the pertinent recorded information and the like.

Figure 3A:
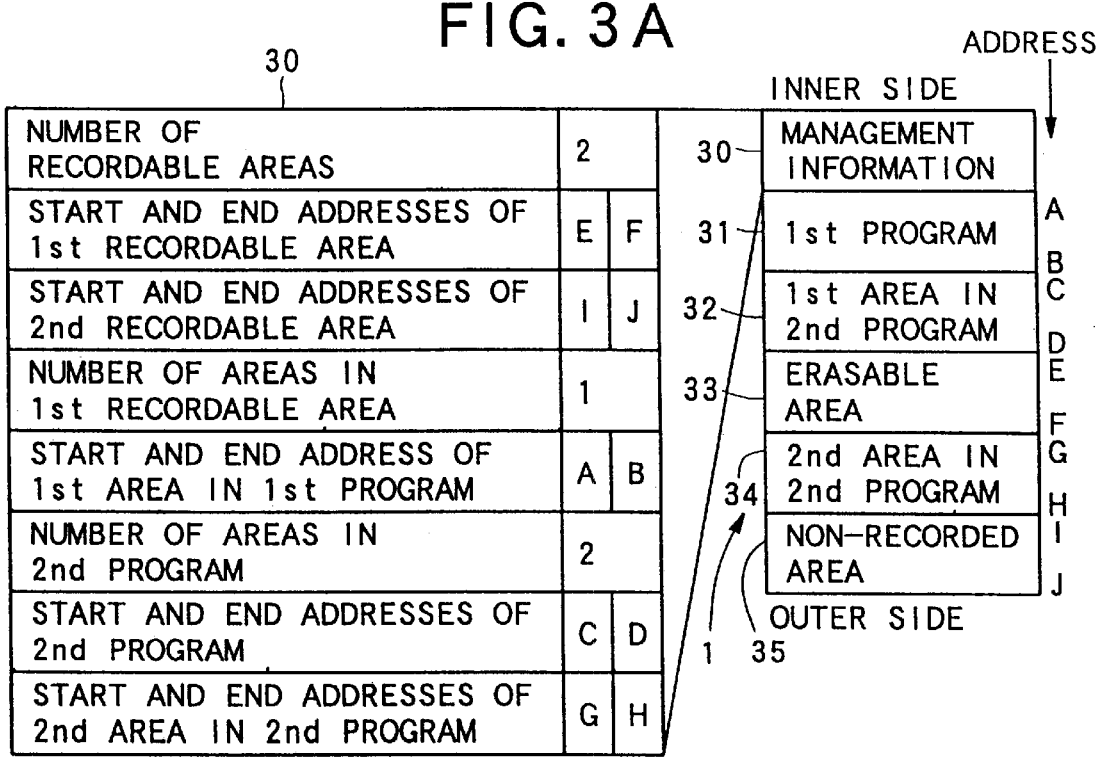
FIG. 3A is a diagram indicating management information before starting the recording operation in the embodiment.

Namely, as shown in FIG. 3A, which shows an example of the optical disc 1 to which two programs have been already recorded, the management information 30 is recorded on the most inner circumferential side of the optical disc 1. The management information 30 includes: the number of recordable areas (which is "2" in case of FIG. 3A) and the addresses thereof (which is a starting address "E" and an ending address "F" of an erasable (re-writable) area 33 and a starting address "I" and an ending address "J" of a non-recorded area 35 in case of FIG. 3A); the number of areas in which the $1^{st}$ program has been recorded (which is "1" in case of FIG. 3A) and the addresses thereof (which are a starting address "A" an ending address "B" of an area 31 of the $1^{st}$ program in case of FIG. 3A); the number of areas in which the $2^{nd}$ program has been recorded (which is "2" in case of FIG. 3A) and the addresses thereof (which are a starting address "C" and an ending address "D" of an area 32 of the $2^{nd}$ program as well as a staring address "G" and an ending address "H" of an area 34 of the $2^{nd}$ program in case of FIG. 3A).

Next, the operation of recording the information in the information recording and reproducing apparatus S is concretely explained. In the explanation hereinbelow, it is assumed that the management information 30 and two programs corresponding to the management information 30

(i.e., the 1st program and the 2nd program) as shown in FIG. 3A are already recorded.

As shown in FIG. 2, in the information recording operation of the present embodiment, when the optical disc 1 is loaded on the information recording and reproducing apparatus S, at first, the management information 30 is read out from the loaded optical disc 1 through the optical pickup 2, the reproduction circuit 11 and the reproduction decoder 12, is taken into the CPU 20 as one portion of the decode signal Spd, and is temporarily stored into the RAM 22 as the management signal Sio (step S1).

Next, it is judged by the CPU 20 whether or not the start of the information recording operation is instructed as the record key 24e of the operation unit 24 is operated (step S2). If it is not instructed (step S2: NO), it waits for the operation of the record key 24e. If it is instructed (step S2: YES), the operation of recording the record signal Sr onto the optical disc 1 is started by the above explained operation from the head of the first recordable area (which is the erasable area 33 in case of FIG. 3A) (step S3).

Then, it is judged whether or not it is possible to record the record signal Sr continuously as the erasable area 33 has an enough empty capacity, by comparing the data amount of the record signal Sr which has been already recorded and the total recording capacity of the erasable area 33 which is described in the management information 30 (step S4). If it is possible (step S4: YES), the recording operation is continued as it is (step S5), and the operation flow proceeds to a step S8.

On the other hand, according to the judgment result at the step S4, if it is not possible to continuously record the record signal Sr since the erasable area 33 has only little or nil residual capacity (step S4: NO), it is judged whether or not any other recordable area exists on the optical disc 1 by referring to the management information 30 in the RAM 22 (step S6). Then, if there is no more recordable area on the optical disc 1 (step S6: NO), since it is difficult to continue recording the record signal Sr, the operational flow proceeds to a step S24 and the information recording operation is stopped.

On the other hand, according to the judgment result at the step S6, if there exists another recordable area (step S6: YES, which is the case of the present embodiment since there exists the non-recorded area 35 as another recordable area as shown in FIG. 3A), the optical pickup 2 is moved to the head of the pertinent recordable area (i.e., the head of the non-recorded area 35). Then, the operation of recording the record signal Sr is continued therefrom (step S7).

After the process at the step S5 or S7 is performed, since the user recognizes the fact that the residual capacity of the recordable area on the optical disc 1 is reduced to a certain level, the user may desire to over-write the record signal Sr on a certain program, which was once recorded in the past and is currently less or not important anymore, so as to newly record the record signal Sr in the area in place of this program. In such a case, the user operates the edit key 24c of the operation unit 24. Accordingly, it is judged by the CPU 20 whether or not the edit key 24c is operated (step S8). If the edit key 24 is not operated (step S8: NO), it is further judged by the CPU 20 whether or not the stop key 24d is operated (step S9). Then, if the stop key 24d is not operated (step S9: NO), since the operation of recording the record signal Sr is to be continued, the operation flow returns to the step S4. If the stop key 24d is operated (step S9: YES), the operation flow proceeds to the step S24 so as to stop the information recording operation.

On the other hand, according to the judgment result at the step S8, if the edit key 24c is operated (step S8: YES), a program list or table of the programs, which had been recorded in advance other than the record signal Sr which has been just recorded, (i.e., the program list of the 1st program and the 2nd program in case of FIG. 3A) is formed on the basis of the management information 30. Then, this program list is displayed as the display information signal S4 on an external monitor (not illustrated) through the on-screen switching circuit 16 etc., (step S10). On the picture plane, the 1st program is displayed in a display manner different from those of the other programs in the program list (hereinafter, to display in such a different display manner is referred to simply as to "highlight-display"). In the program list, the title and the recording date and time of each program which has been already recorded are displayed.

Then, it is judged by the CPU 20 whether or not the +key 24a of the operation unit 24 is operated by the user so as to select an erasable program, which can be erased and on which the record signal Sr can be over-written, from among the programs in the displayed program list (step S11). If the +key 24a is operated (step S11: YES), the highlight-displayed portion is moved up in the program list. Namely, another program, which is located in the program list just above one program which has been highlight-displayed, is newly highlight-displayed (step S12), and the operation flow returns to the step S11.

On the other hand, according to the judgment at the step S11, if the +key 24a is not operated (step S11: NO), it is further judged by the CPU 20 whether or not the −key 24b of the operation unit 24 is operated by the user so as to select the erasable program, on which the record signal Sr can be over-written, from among the programs in the displayed program list (step S13). If the −key 24b is operated (step S13: YES), the highlight-displayed portion is moved down in the program list. Namely, another program, which is located in the program list just below one program which has been highlight-displayed, is newly highlight-displayed (step S14), and the operation flow returns to the step S13. By repeating the processes from the steps S11 to the step S14, the erasable program which is allowed to be erased is selected.

According to the judgment result at the step S13, if the −key 24b is not operated (step S13: NO), since the selection of the erasable program is completed, it is judged whether or not the erase key 24f of the operation unit 24 is operated so as to erase the erasable program which is currently highlight-displayed in the program list (step S15).

Then, if the erase key −24f is operated (step S15: YES), the erasable program which is currently highlight-displayed in the program list is erased on the management information 30 in the RAM 22 (step S16). Then, the management information 30 is re-written so as to specify or assign this area where the erased program has been recorded as a newly recordable area on the management information 30 (step S17). Then, the operation of displaying the program list on the monitor is canceled (step S18), and the operation flow returns to the step S4 so as to continue recording the record signal Sr.

Incidentally, during the processes from the step S10 to the step S18, the operation of recording the record signal Sr on the recordable area (except for the area specified as the new recordable area by the step S17) is continued.

Then, according to the judgment result at the step S15, if the erase key 24f is not operated (step S15: NO), since there is no erasable program, it is judged whether or not it is possible to still continue recording the record signal Sr onto the area where the record signal Sr is currently being recorded (step S19). If it is possible (step S19: YES), the recording operation is continued as it is (step S20), and the operation flow proceeds to a step S23.

On the other hand, according to the judgment result at the step S19, if it is not possible to continue recording the record information Sr since the residual capacity of the recordable area is little or nil (step S19: NO), it is judged whether or not any other recordable area exists by referring to the management information 30 in the RAM 22 (step S21). Then, if there is no more recordable area on the optical disc 1 (step S21: NO), since it is difficult to continue recording the record signal Sr, the operational flow proceeds to the step S24 and the information recording operation is stopped.

On the other hand, according to the judgment result at the step S21, if there exists another recordable area (step S21: YES), the optical pickup 2 is moved to the head of the pertinent recordable area. Then, the operation of recording the record signal Sr is continued therefrom (step S22).

After the process at the step S20 or S22 is performed, it is judged whether or not the stop key 24d is operated (step S23). If it is not operated (step S23: NO), the operation flow returns to the step S11 so as to select again the erasable program. On the other hand, if the stop key 24d is operated (step S23: YES), the information recording operation is stopped (step S24).

Then, with respect to the management information 30 which has been re-written at the step S17, the information indicating the addresses etc., of the record signal Sr which has been newly recorded by the processes until the step S23 is described. Then, after describing this information, this information is read out from the RAM 22, and is recorded to the area, where the management information 30 is to be recorded on the optical disc 1, as the management information signal S6 through the switch 8, the record encoder 9, the record circuit 10 and the optical pickup 2. Namely, the management information 30 on the optical disc 1 is updated (step S25). Finally, the information recording operation is ended.

Here, the management information updated in the step S25 is explained with reference to an example shown in FIG. 3B.

For example, it is assumed that the $1^{st}$ program is selected as the erasable program from among the programs shown in FIG. 3A, and the record signal Sr is newly recorded (overwritten) to the area where the $1^{st}$ program has been recorded. In the management information updated by the step S25, the new program is recorded to a partial area 41 (i.e., an area indicated by the starting address "A" and the ending address "K" in FIG. 3B) of the area 31, where the $1^{st}$ program had been recorded, and to the original erasable area 33. Also, the area other than the area 41 in the original area 31 (i.e., the area indicated by the starting address "L" and the ending address "B" in FIG. 3B) is assigned as a new recordable area 42. Further, the new program is recorded to the original non-recorded area 35.

Figure 3B:
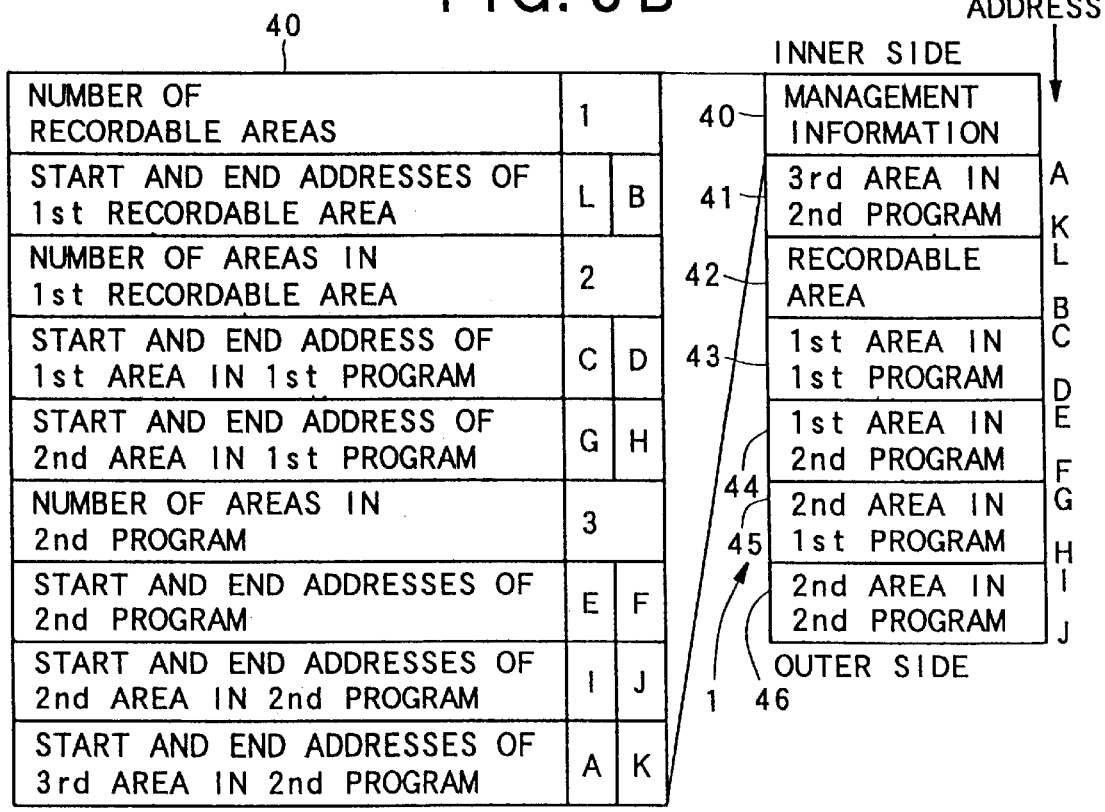
FIG. 3B is a diagram indicating the management information after the recording operation in the embodiment.

At this time, in the updated management information 40, since the $1^{st}$ program which is shown in FIG. 3A has been erased, the original $2^{nd}$ program which is shown in FIG. 3A is updated to be the new $1^{st}$ program in FIG. 3B, and the newly recorded program is updated to be the new $2^{nd}$ program. Therefore, the $2^{nd}$ program in FIG. 3B is recorded discretely to the area 41, the area 44 and the area 46 as shown in FIG. 3B.

As described above, according to the information recording operation of the information recording and reproducing apparatus S of the embodiment, since the operation of recording the record signal Sr is continued while reserving the erasable area on the optical disc 1, where the program has been recorded, as the recordable area, it is possible to record the record signal Sr in a greater amount without stopping the recording operation.

Further, the management information 30 includes the addresses of the recordable areas. The record signal Sr is firstly recorded to the recordable area, and is recorded to the erasable area continuously when the residual capacity of the recordable area decreased to be little or nil. Accordingly, even if the non-recorded recordable area becomes little or nil, it is still possible to record the record signal Sr in a greater amount without stopping the recording operation.

Further, when selecting the erasable program which can be erased, since at least the title and the recording date and time of each program are displayed in the program list, it is possible for the user to easily judge the erasable program.

(II) Second Embodiment

Next, a second embodiment of the present invention will be explained with reference to FIG. 4. Now, the hardware structure of the second embodiment is same as that of the first embodiment shown in FIG. 1, and the explanation thereof is omitted. The second embodiment is different, in the software structure for controlling the information recording operation by the CPU 20, from the first embodiment. Thus, hereinafter, the information recording operation controlled by the CPU 20 in the second embodiment is explained with reference to FIG. 4. In FIG. 4, the same steps as those in FIG. 2 of the first embodiment carry the same step numbers and the explanations thereof are omitted.

In FIG. 4, after the processes at the steps S1 to S7 are performed in the same manner as the first embodiment of FIG. 2, the residual capacity is continuously monitored by the CPU 20 while the record signal Sr is continuously being recorded, and it is continuously judged by the CPU 20 whether or not there exists a residual capacity for recording the record signal Sr larger than a predetermined capacity $\Delta C$ (step S28). For example, it is judged by the CPU 20 whether or not the residual capacity decreases to be equal to or less than a predetermined capacity $\Delta C$ which is set in advance by the user or the manufacturer of the information recording and reproducing apparatus S while the process of recording the record signal Sr (according to the step S5 or S7) is being continued, by referring to the residual capacity of the recordable area on the basis of the management information 30 in the RAM 22 (which is stored at the step Si) and by continuously monitoring the recorded information amount on the whole optical disc 1 after staring the recording operation.

After that, the processes at the steps S9 to S25 are performed in the same manner as the first embodiment of FIG. 2.

According to the second embodiment, without the necessity of manually pushing the edit key 24c of the operation unit 24, the program list can be automatically displayed when the editing procedure after the step S10 is desirable. Thus, the user does not have to check or monitor the residual capacity of the recordable area of the optical disc 1.

It is also possible to set one of an automatic mode and a manual mode by use of a mode setting key etc., in the information recording and reproducing apparatus S such that the step S8 using the editing key 24c is performed in the manual mode, while the step S28 is performed in the automatic mode.

(III) Modified Embodiment

In the above described embodiments, the record medium is the optical disc 1. Other than this, it is possible to employ various kinds of record mediums such as a semiconductor memory and the like as long as the record signal Sr can be recorded thereon and a so-called random accessing operation is possible.

Further in the above described embodiments, the MPEG 2 method is employed as the compression process. Other than this, it is possible to employ various kinds of compression processes.

Furthermore, the present invention can be applied to various types of information recording apparatuses as long as they process the information to be recorded upon recording it.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10–9834 filed on Jan. 21, 1998 including the specification, claims, drawings and summary is incorporated herein by reference in its entirety.

What is claimed is:

1. An information recording apparatus for recording information onto a record medium having a predetermined capacity, on which (i) a plurality of information groups each comprising one series of information and (ii) management information including positional information are recorded, said positional information indicating a recorded area on which the information groups are recorded, said apparatus comprising:

a detecting device for detecting the management information, which is recorded in advance on said record medium, from said record medium;

a recording device for recording information onto said record medium;

an outputting device for outputting an identification information to identify the information groups, which are recorded in advance on said record medium, an inputting device for inputting a user's instruction to erase specific information from among the information groups;

a determining device for determining whether or not the user's instruction is inputted by the inputting device while the recording device is recording information;

an updating device for updating the management information so as to treat the recorded area, on which the specific information is recorded, as a new recordable area in a case where the determining device determines that the user's instruction is inputted while the recording device is recording information;

a controlling device for controlling said recording device to continuously record information on a recordable area, which includes the new recordable area, on the basis of updated management information.

2. An apparatus according to claim 1, wherein the positional information further indicates the recordable area including the new recordable area and said controlling device controls said recording device to record the information at first to the recordable area on the basis of the positional information included in the detected management information and then to continuously record the information to the new recordable area when a recordable capacity of the non-recorded area is decreased to be less than a predetermined capacity.

3. An apparatus according to claim 1, wherein one or a plurality of the information groups constitutes a program, said identification information includes (i) a title of the program and (ii) date and time of recording the program, and said outputting device outputs the identification information as a program list or table including the title and the date and time.

4. An apparatus according to claims 3, wherein said inputting device further inputs a user's instruction to select the specific information, and said outputting device comprises a displaying device for displaying the program list or table and for indicating the specific information when the user's instruction to select the specific information is inputted.

5. An apparatus according to claim 4, wherein said displaying device highlight-displays each portion of the program list or table as a candidate of the information to be erased.

6. An apparatus according to claim 1, wherein the inputting device further inputs output instruction to instruct said outputting device to output the identification information, said outputting device outputs the identification information when the output instruction is inputted by said inputting device.

7. An apparatus according to claim 1, further comprising a judging device for judging whether or not a residual capacity of the recordable area is larger than a predetermined capacity, said outputting device outputting the identification information if the residual capacity is judged to be not larger than the predetermined capacity.

8. An apparatus according to claim 1, wherein the updating device updates the management information so that the updated management information includes the positional information indicating the recorded area after said recording device records the information, said recording device further records the updated management information onto said record medium.

9. An apparatus according to claim 1, further comprising a memory device for storing the detected management information.

10. An apparatus according to claim 1, further comprising a reproducing device for reproducing the management information from said record medium and reproducing information on the basis of the detected management information.

11. An information recording method for recording information onto a record medium having a predetermined capacity, on which (i) a plurality of information groups each comprising one series of information and (ii) management information including positional information are recorded, said positional information indicating a recorded area on which the information groups are recorded, said apparatus comprising:

a detecting process for detecting the management information, which is recorded in advance on said record medium, from said record medium;

a recording process for recording information onto said record medium;

an outputting process for outputting an identification information to identify the information groups, which are recorded in advance on said record medium;

an inputting process for inputting a user's instruction to erase specific information from among the information groups;

a determining process for determining whether or not the user's instruction is inputted while information is being recorded;

an updating process for updating the management information so as to treat the recorded area, on which the specific information is recorded, as a new recordable area in a case where it is determined that the user's instruction is inputted while information is being recorded; and a controlling process for controlling said recording process to continuously record information on a recordable area, which includes the new recordable area, on the basis of the updated management information.

12. A method according to claim 11, wherein the positional information further indicates the recordable area including the new recordable area, and said controlling process controls said recording process to record the information at first to the recordable area on the basis of the positional information included in the detected management information and then to continuously record the information to the new recordable area when a recordable capacity of the non-recorded area is decreased to be less than a predetermined capacity.

13. A method according to claim 11, wherein one or a plurality of the information groups constitutes a program, said identification information includes (i) a title of the program and (ii) date and time of recording the program, and said outputting process outputs the identification information as a program list or table including the title and the date and time.

14. A method according to claim 13, wherein said inputting process further inputs a user's instruction to select the specific information, and said outputting process comprises a displaying process for displaying the program list or table and for indicating the specific information when the user's instruction to select the specific information is inputted.

15. A method according to claim 14, wherein said displaying process highlight-displays each portion of the program list or table as a candidate of the information to be erased.

16. A method according to claim 11, wherein the inputting process further inputs an output instruction to output the identification information, said outputting process outputs the identification information when the output instruction is inputted.

17. A method according to claim 11, further comprising a judging process for judging whether or not a residual capacity of the recordable area is larger than a predetermined capacity, said outputting process outputting the identification information if the residual capacity is judged to be not larger than the predetermined capacity.

18. A method according to claim 11, wherein the updating device updates the management information so that the updated management information includes the positional information indicating the recorded area after information is recorded, said recording process further recording the updated management information onto said record medium.

19. A method according to claim 11, further comprising a storing process for storing the detected management information.

20. A method according to claim 11, further comprising a reproducing process for reproducing the management information from said record medium and reproducing information on the basis of the detected management information.

* * * * *